United States Patent [19]

Fütterer

[11] Patent Number: 4,461,065
[45] Date of Patent: Jul. 24, 1984

[54] TUBE COVER MOUNTING METHOD

[75] Inventor: Bodo Fütterer, Lucerne, Switzerland

[73] Assignee: Interelectric AG, Switzerland

[21] Appl. No.: 230,962

[22] PCT Filed: May 22, 1980

[86] PCT No.: PCT/DE80/00077
§ 371 Date: Jan. 23, 1981
§ 102(e) Date: Jan. 21, 1981

[87] PCT Pub. No.: WO80/02529
PCT Pub. Date: Nov. 27, 1980

[30] Foreign Application Priority Data

May 23, 1979 [DE] Fed. Rep. of Germany ....... 2921071

[51] Int. Cl.³ .............................................. B23P 11/02
[52] U.S. Cl. ...................... 29/446; 29/509; 29/520; 29/522 R; 138/89; 138/92; 264/249
[58] Field of Search ............... 29/509, 520, 522 R, 29/447, 446; 138/89, 92 R; 264/249, 230

[56] References Cited

U.S. PATENT DOCUMENTS

| 2,421,105 | 5/1947 | Warren, Jr. ............... 264/249 X |
| 2,679,913 | 6/1954 | Scott ....................... 264/249 X |
| 3,458,618 | 7/1969 | Burns et al. ............... 264/249 |
| 3,578,027 | 5/1971 | Zapfi ....................... 138/89 |

FOREIGN PATENT DOCUMENTS 2132069 11/1972 France .
1153000 5/1969 United Kingdom .

Primary Examiner—Charlie T. Moon
Attorney, Agent, or Firm—Townsend and Townsend

[57] ABSTRACT

A fastening device by which a thermoplastic cover may be fixed to a tubular component. The cover fits tightly into the tubular component which is provided in the region of the cover with bores through which a lost pin is pressed after heating into the constituent material of the cover. The pin has a smaller diameter than the bore so that material displaced by the hot pin is able to flow into the bore.

5 Claims, 2 Drawing Figures

TUBE COVER MOUNTING METHOD

This invention relates to a fastening device for fastening a cover of thermoplastic material to a tubular component.

In one known fastening device of this type, the cover projects at least partly with a tight fit into the tubular component and the tubular component is provided with a number of bores in that region which is covered by the projecting part of the cover. In this case, fastening is carried out by inserting a heated pin through the bores into the constituent material of the cover so that it is softened and forced by displacement into the bore. The pin is then withdrawn again so that the cover is held fast by the material forced into the bores. A fastening device of this type generates only a limited retaining force per bore.

The object of the present invention is to provide a fastening device of the type mentioned at the beginning which generates a considerably higher retaining force.

According to the invention, this object is achieved by a pin of a non-thermoplastic material which projects through each bore into the material of the cover and which is held thereby The pin is preferably made of metal.

The pin should have a smaller diameter than the bores so that the material displaced by the heated pin has enough room to penetrate into the bore.

According to another aspect of the invention, the pin comprises at least one peripheral groove around its circumferential surface to provide the pin with a firmer hold.

It is favourable for the pin to be tapered at both ends to make it easier to press into the constituent material of the cover.

The present invention also relates to a method of fixing a cover of thermoplastic material to a tubular component, the cover projecting at least partly with a tight fit into the tubular component and the tubular component being provided with a number of straight-through bores in that region which is covered by the projecting part of the cover.

According to the invention, the cover is positioned as required in the tubular component, pins smaller in diameter than the bores are produced from a non-thermoplastic material and, after heating to a temperature above the softening temperature of the thermoplastic material, a pin is pressed through each bore into the constituent material of the cover.

To fasten a cover comprising a shoulder surface which, in the inserted position of the cover, rests on an edge of the tubular component, it is favourable for the cover to be inserted preheated into the tubular component and to be fastened in this preheated state. When the cover subsequently cools, it contracts so that the shoulder surface of the cover presses against the edge of the tubular component.

One example of embodiment of the invention is described in detail in the following with reference to the accompanying diagrammatic drawings, wherein.

Figure 1:
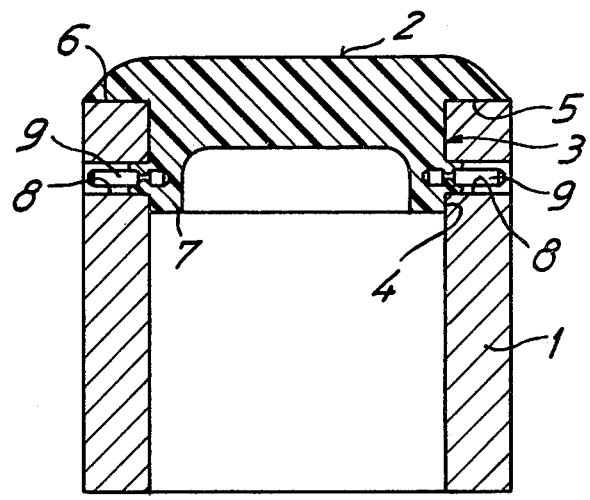
FIG. 1 is an axial section through a tube closed by a cover with a cover fastening.

FIG. 1 shows a cylindrical tube section 1, for example an iron return element of an electric motor, of which one end opening is closed by a cover 2 of plastic. The cover 2 is substantially disc-like and, around its outer periphery, comprises a recess 3 forming a circular peripheral region 4 which fits tightly into the interior of the tube section 1. The recess 3 is axially delimited by an annular shoulder surface 5 which rests on the end face 6 of the tube section 1.

That part of the cover 1 which lies inside the tube section changes into an annular collar 7 which rests on the tube section 1.

Figure 2:
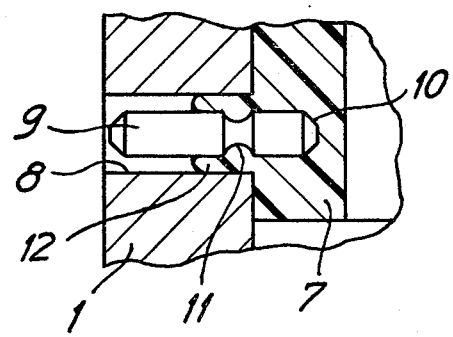
FIG. 2 shows a fastening device on a larger scale.

As can be seen in particular from FIG. 2, the fastening device comprises a number of radial bores 8 which are uniformly distributed around the circumference of the tube section 1 at the level of the annular collar 7. A metal pin 9 is inserted into each of these bores, being tapered at its ends by chamfers 10 and being provided at its center with an annular groove 11.

The cover 2 is made of a thermoplastic material, the pins 9 of brass and the tube section 1 of iron.

To fasten the cover to the tube section, the cover 2 is heated to a temperature above the operating temperature of the finished unit. The cover is then placed on that end of the tube section 1 which is provided with the bore 8, after which a pin 9 heated to a temperature above the softening temperature of the material of the cover 2 is introduced into a bore 8 and pressed through into the constituent material of the annular collar 7. Because the pin softens the material through its high temperature, the material is displaced, enters the bore 8 and also fills the annular groove 11 so that, after cooling, the pin 9 sits firmly and, together with the displaced plastic 12, firmly holds the cover 2. Since, as already mentioned, the cover was heated to a higher temperature than the operating temperature, it gradually cools and, in doing so, contracts so that the shoulder surface 5 rests under pressure on the end surface 6 and, in doing so, guarantees effective and firm seating of the cover on the tube section.

Although the cover fastening may be used quite generally, it may be used with particular advantage for fastening the cover—carrying the brushes and connecting lugs—of an electric motor 1, in which the tube section 1 may be an iron return element or a housing.

I claim:

1. A method for permanently fixing a molding of thermoplastic material to a non-thermoplastic tube section snugly surrounding the molding, the tube section including radially oriented bores, the method comprising the steps of providing non-thermplastic pins having a lesser diameter than the diameter of the bores, heating the pins, displacing thermoplastic material into a gap between the pins and walls of the bores by pressing the pins through the bores into the thermoplastic material to bond the pins and retain same as lost elements in the thermoplastic molding.

2. A method for permanently fixing a molding of thermoplastic material to a non-thermoplastic tube section snugly surrounding the molding, the tube section including radially oriented bores, the method comprising the steps of providing non-thermoplastic pins having a lesser diameter than the diameter of the bores, heating the pins, displacing thermoplastic material into a gap between the pins and walls of the bores by pressing the pins through the bores into the thermoplastic material, forming a recess in a circumferential surface of the pins prior to the pressing step to allow the thermoplastic material to flow into said recess during the pressing step and thereby interlock said pins in the thermoplastic material in said bores, and leaving the pins as lost elements in the thermoplastic molding.

3. The method according to claim 2 wherein said recess is a peripheral groove.

4. A method according to claim 2 wherein the molding is a cover having a shoulder surface formed and arranged to rest on an end surface of the tube section and a portion of the cover is inserted into the tube section, and wherein the method comprises the further step of preheating the cover prior to inserting the portion of the cover in the tube section, the step of pressing being performed while the cover is preheated to allow the cover to cool and contract to pull said shoulder surface against said end surface of said tube section to more effectively seal said cover to the end surface of the tube.

5. A method according to claim 2 including the step of forming tapers in at least one end of the pin prior to the pressing step.

* * * * *